Feb. 23, 1937.    M. J. HYMAN    2,071,532
WASTE PIPE TRAP PLUG
Filed Nov. 12, 1935    2 Sheets-Sheet 1
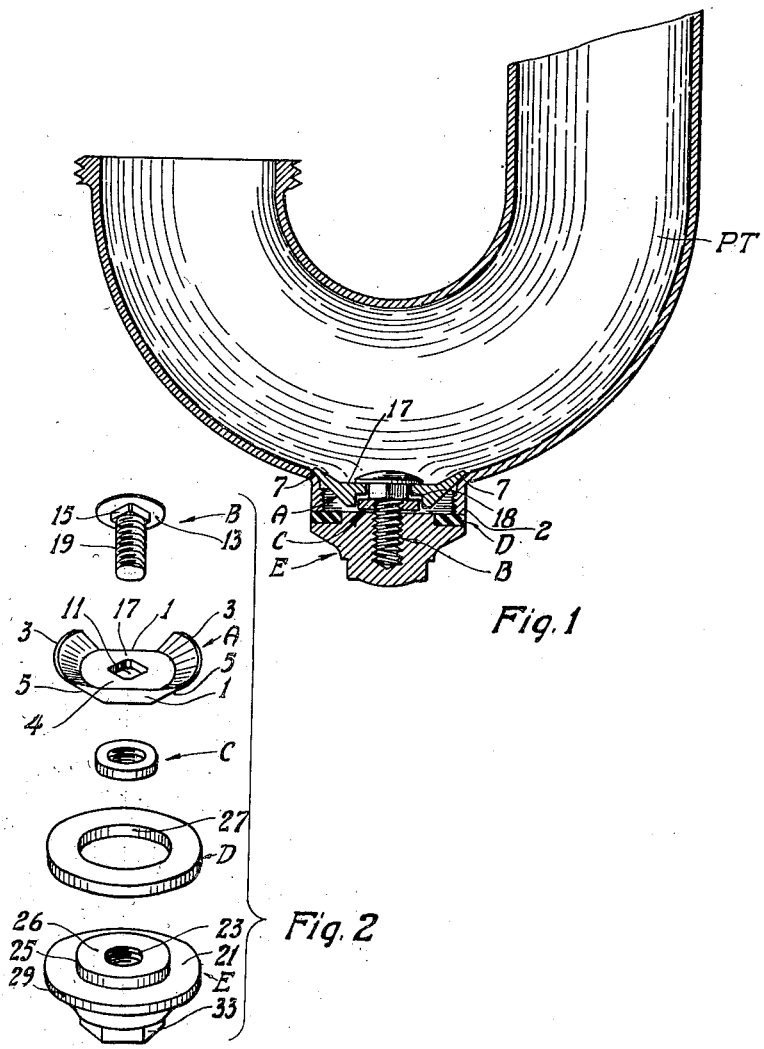
INVENTOR.
Morris J. Hyman
BY
Harry Langsam
ATTORNEY Patented Feb. 23, 1937

2,071,532

UNITED STATES PATENT OFFICE 2,071,532

WASTE PIPE TRAP PLUG

Morris J. Hyman, Philadelphia, Pa.

Application November 12, 1935, Serial No. 49,340

7 Claims. (Cl. 182—24)

My invention relates to pipe traps and relates more particularly to a universal waste pipe trap plug.

Traps for the ordinary lavatory waste water pipes usually have a threaded bore in the lower portion thereof through which bore the waste water may pass, or for removing sediment, or for the removing of water therefrom in winter to prevent freezing of the water and hence breaking of the pipe. Into the threaded bore is usually fitted a threaded plug which has a head thereon that may be grasped by a wrench whereby the plug may be firmly screwed into position or removed. Different manufacturers of plumbing pipes usually use different diameter bores and plugs, or different types of threads on the bore and plug, or employ a number of threads on the plug and bore which are different from the number of threads on the plug and bore of their business competitor.

It is necessary to replace the plug on the waste pipe trap when the plug is lost or the threads thereon are stripped and this requires the party making the repair to wait until a new plug arrives from the factory unless a plumbing supply store in the vicinity carries a plug of the same type as the lost or stripped plug. The local plumbing supply store in order to be adequately supplied must carry a large number of plugs made by different manufacturers, and practically, the plug sought cannot be obtained.

Therefore, it is an object of my invention to overcome the above defects by constructing a plug that may be used upon pipe traps having different diameter bores, or it may be used upon pipe traps wherein the number or type of threads vary.

Another object of my invention is to construct a drain pipe trap plug that can be easily installed and readily removed.

Another object of my invention is to construct a plug that retains a flexible gasket so that the latter may be forced into engagement with the end of the nozzle forming the trap opening in order that a watertight connection is formed between the flange of the plug and the end of the nozzle.

Another object of my invention is to construct a universal drain pipe plug which will not reduce the cross-sectional area of the drain pipe.

Another object of my invention is to construct a universal drain pipe plug which will have the external appearance similar to that of the plug it replaces.

Other objects of my invention are to provide an improved device of the character described, that is easily and economically produced, and which is sturdy in construction.

With the above and related objects in view, my invention consists in the following details of construction and combination of parts, as will be more fully understood from the following description, when read in conjunction with the accompanying drawings in which:

Fig. 1 is a sectional view through my improved plug and a portion of a drain pipe trap.

Fig. 2 is an exploded view showing the component parts of my improved plug.

Figure 3:
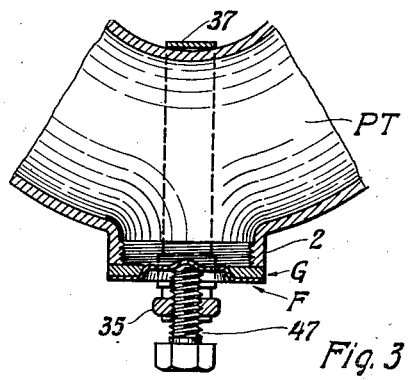
Fig. 3 is a sectional view through a portion of a drain pipe trap and a modified form of my improved plug, the latter being held in position by a cross bar and a strap.

Referring now in greater detail to the drawings, I show in Fig. 1 a pipe, generally designated as PT, which is formed as a waste pipe trap, wherein a threaded bore or nozzle 2 is adapted to receive a solid threaded plug (not shown). The opening is closed by a universal waste pipe trap plug, generally designated as E, hereinafter further described.

A waste pipe trap plug securing member A has a disc-like central member 4 with a central square opening bolt 11 therethrough. From diametrically opposite peripheral edges of the central member 4 extend arcuate shaped diverging flanges 3, 3. The side edges of the flanges 3, 3 lie in substantially parallel planes 1, 1, the planes being a distance apart which is less than the inside diameter of the nozzle opening. The arcuate diverging members 3, 3 extend a distance to overlap the inside end 7 of the nozzle 2. Care should be taken so that the cross-sectional area of the pipe is not materially reduced which would be the case if the central and the arcuate diverging members are made unduly large. In order to keep the cross-sectional area of the pipe trap as large as possible, the flanges 3, 3 are located to diverge upwardly so that the disc-like central member is within the bore or nozzle 2.

The uppermost flat surface 17 of the plug securing member A engages the underside portion of a bolt head 13, the bolt being generally designated as B. The square shank 15 of the bolt interfits with the square central opening 11 thereby preventing the bolt from turning with respect to the plug securing member A. Hence, since the flanges 3, 3 engage the inner end of the nozzle 2, the frictional force between the nozzle and the flanges prevents the plug securing member from turning when the plug is installed. The lowermost surface of the central portion of the disc-like member is countersunk to receive a small holding lock nut, generally designated as C.

The lock nut C is arranged to receive the threaded portion 19 of the bolt B, the outside diameter of the lock washer being slightly smaller than the recess 18 on the plug retaining member 4, the lock nut C is used to hold the bolt B and the plug retaining member A together when the plug unit is being installed.

The lock nut C is not placed upon the threaded shank 19 of the bolt B so that the bolt B is firmly attached to the securing member A. On the contrary the lock nut C is placed upon the threaded shank so that it is spaced from the securing member A, thus, the lock nut merely limits the movement of the bolt B along the longitudinal axis of the bolt. This loose connection of the bolt and the retaining member is necessary to permit tilting of the retaining member with respect to the bolt B while the retaining member is being inserted into the bore whereby the flanges 3, 3 can engage the inner end of the nozzle 2.

A flexible gasket, generally designated as D, is secured to engage the mouth of the trap plug nozzle, the gasket being held in position by the flange 21 of the plug member E.

The plug member E has a central circular portion 21 with its outside periphery 29 of a diameter approximately the same as the outside diameter of the drain plug nozzle 2. The plug member E has a centrally located tapped hole 23 which opens on its upper surface, and the tapped hole is arranged to receive a threaded shank 19 of a holding bolt B, the threaded hole 23 being of a sufficient depth to allow the plug assembly to be securely fastened in place. A circular raised member 25 on the upper portion of the plug member E interfits with the inside diameter 27 of the washer D.

It is to be noted that the outside surface closure plug E, Figs. 1 and 2, may be nickel or chromium plated and formed to have the appearance of a hexagonal head 33, which head is similar in construction to the head of the plug which my improved drain pipe trap cleanout closing device replaces. Thus, the physical appearance of the plug embodying my invention does not alter the appearance of the drain trap which in some cases is important.

The method of applying my waste pipe drain plug shown in Figs. 1 and 2 is as follows:

The bolt B is inserted through the opening in the securing member A, and the lock nut C is turned upon the bolt so that a limited amount of "play" exists between the bolt and the securing member A. The plug E having the washer D interfitting with the central boss 26 is then threaded upon the bolt B. However, the plug E is merely placed upon the bolt so that the two elements are just held together. The securing member is tilted and pushed through the nozzle opening and the unit is moved until the two flanges 3, 3 rest upon the inner edges of the nozzle 2. In the above described position, the plug is pulled downwardly and turned, sufficient friction exists between the flanges and the end of the nozzle to enable the plug to be turned tightly into position.

In Fig. 3 is illustrated a modified form of a plug whereby a plug, generally designated as F, is held in position by a strap. The plug member F supports a gasket, generally designated as G, in contact with the outside end of the drain trap plug nozzle. The plug and washer are securely held in place by a bolt 47, the bolt being attached to a cross bar 35, and the cross bar in turn being supported by a strap 37.

Figure 4:
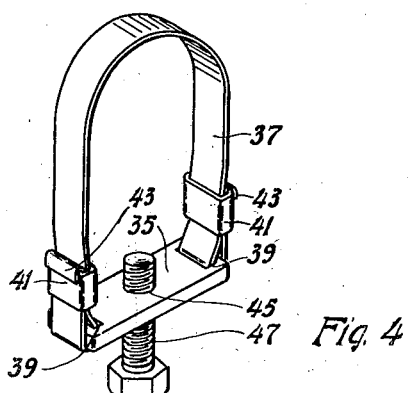
Fig. 4 is an isometric view of the band and the cross bar that secures the plug, shown in Fig. 3, in place.

Fig. 4 is an isometric view of the cross bar 35 and the strap 37 assembly. The strap comprised of metal passes around the outside of the drain pipe, and its ends 43, 43 pass under the ends of the cross bar 35 and pass up through the rectangular holes 39, 39 of the cross bar 35, and each end 43 of the strap 37 further passes up through a rectangular band 41 and is bent down over the outside portion of the band 41. In the center of the cross bar 35 is a tapped hole 45 which receives the hexagonally threaded bolt 47, the bolt 47 securely holds the plug F and a washer, generally designated as G, in position, as is illustrated in Fig. 3.

Figure 7:
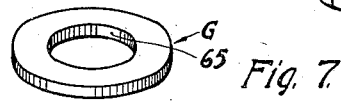
Fig. 7 is an isometric view of the gasket as used between the plug and the nozzle of the trap opening, see Figs. 3 and 5.

Fig. 7 illustrates the flexible gasket G, the gasket preferably being constructed of rubber.

Figure 5:
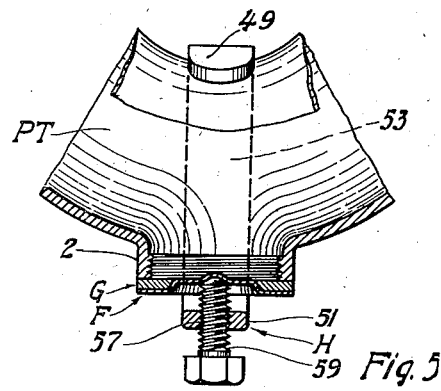
Fig. 5 is a sectional view through a portion of a trap and a modified form of my improved plug, the latter being held in position by a hook shaped clamp.
Figure 8:
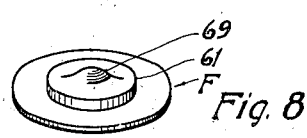
Fig. 8 is a isometric view of a modified form of my improved plug as shown in Figs. 3 and 5.

Fig. 8 illustrates the disc plug F, which plug is shown mounted as a plug on a pipe trap PT, see Figs. 3 and 5. A raised central portion or boss 61 has an outside curved peripheral surface 63 that interfits with the inside curved surface 65 of the gasket G, the outside diameter of the plug G is approximately of the same outside diameter as the washer G and the outside diameter of the nozzle which forms the drain pipe trap opening. In the center of the raised portion of the plug F is an upward extending recess 69 that interfits with the end 67 of the bolt 59.

In Fig. 5 is illustrated the modified form of a plug in which the plug member F and gasket G are securely held in place by the hook-shaped clamp, generally designated as H. This enables the plug F and its washer G to be easily attached or removed but is not as pleasing in appearance as the plug illustrated in Figs. 1 and 2.

Figure 6:
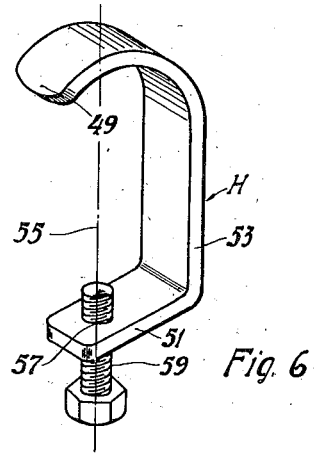
Fig. 6 is an isometric view of the hook shaped clamp that secures the plug, shown in Fig. 5, in place.

Fig. 6 illustrates the hook-shaped clamp H, The upper end 49 of the clamp curves over the outside of the pipe and extends beyond the centerline of the tube, and the lower portion 51 of the clamp is bent at right angle to the side 53 of the clamp. The inturned side extends beyond the center-line 55 of the clamp. Through the lower portion of the clamp 51 on the centerline 55 of the clamp is a tapped hole 57 in which is threaded a hexagonal threaded bolt 59; the bolt 59 and the clamp H securely hold the plug F and the washer G in place over the end of the drain trap plug nozzle 2.

It is also to be observed that it is not necessary for the cleanout nozzle 2 to have an outwardly extending flange on the outside end thereof, and the same closure device may be used upon nozzles of different diameters or having different types or numbers of threads.

Although the invention has been described in considerable detail, such description is intended as illustrative rather than limiting, as the invention may be variously embodied, and the scope of the invention is to be determined as claimed.

I claim:—

1. A drain pipe trap cleanout closing device comprising an inner securing member and an outer closing member, and a threaded bolt having a square upper shank, said bolt joining said securing member and the outer closing member, said securing member having a square opening therein whereby said square shank interfits with the square opening thereby preventing said threaded member from turning relative to said securing member.

2. A drain pipe trap cleanout closing device comprising an inner securing member and an outer closing member, a threaded bolt joining said securing and closing members, and a lock nut cooperatively retaining said bolt to said securing member, said lock nut being mounted upon said bolt to permit movement of said bolt and said securing member in a direction along the longitudinal axis of said bolt.

3. A drain pipe trap cleanout closing device and a drain pipe, said drain pipe having a nozzle thereon comprising an inner securing member and an outer closing member, a threaded member joining said securing and closing members, a gasket positioned between the nozzle of said drain pipe and said closing member, and means for securely holding the securing member and closing members together.

4. A plug adapted for a waste pipe trap nozzle comprising a plug holding member having spaced flanges thereon, said flanges being adapted to overlap the inside diameter of the pipe nozzle, a screw threaded bolt firmly attached to said plug holding member, and a closure plug having a tapped hole therein whereby the closure plug may be screwed upon or screwed from said screw threaded bolt.

5. A plug adapted for a waste pipe trap nozzle comprising a plug holding member having spaced flanges thereon, said flanges being adapted to overlap the inside diameter of the pipe nozzle, a screw threaded bolt firmly attached to said plug holding member, and a closure plug having a tapped hole therein whereby the closure plug may be screwed upon or screwed from said screw threaded bolt, and a circumferential flange on said plug holding member, and a flexible washer being adapted to have its inside diameter engage said flange whereby the washer cannot move in a transverse direction with respect to the longitudinal axis of said closure plug.

6. A plug adapted for a waste pipe trap nozzle comprising a plug holding member having spaced flanges thereon, said flanges being adapted to overlap the inside diameter of the pipe nozzle, a screw threaded bolt firmly attached to said plug holding member, and a closure plug having a tapped hole therein whereby the closure plug may be screwed upon or screwed from said screw threaded bolt, said plug including an external head whereby it may be grasped by a wrench and whereby it has the external appearance of a male threaded plug.

7. A drain pipe trap cleanout closing device adapted to be secured to a waste pipe having a waste discharge nozzle; said closing device comprising an inner securing member, said securing member having contracted transversely extending portions, and wedge-shaped circumferentially curved flanges extending upwardly at an angle; an outer closing plug member for said discharge nozzle; and a member joining the securing member and the outer closing member together.

MORRIS J. HYMAN.